(12) United States Patent
Dubrovskiy et al.

(10) Patent No.: US 11,904,893 B2
(45) Date of Patent: Feb. 20, 2024

(54) OPERATING A VEHICLE

(71) Applicant: Motional AD LLC, Boston, MA (US)

(72) Inventors: Grigoriy Dubrovskiy, Boston, MA (US); Aditya Sreekumar, Medford, MA (US); Siddharth Menon, Boston, MA (US)

(73) Assignee: Motional AD LLC, Boston, MA (US)

( * ) Notice: Subject to any disclaimer, the term of this patent is extended or adjusted under 35 U.S.C. 154(b) by 121 days.

(21) Appl. No.: 17/363,444

(22) Filed: Jun. 30, 2021

(65) Prior Publication Data

US 2023/0001954 A1 Jan. 5, 2023

(51) Int. Cl.
*B60W 60/00* (2020.01)
*G06N 3/08* (2023.01)

(52) U.S. Cl.
CPC ........ *B60W 60/00133* (2020.02); *G06N 3/08* (2013.01); *B60W 2540/229* (2020.02); *B60W 2552/35* (2020.02); *B60W 2710/1038* (2013.01)

(58) Field of Classification Search
CPC ....... B60W 60/00133; B60W 2552/35; B60W 2540/229; B60W 2710/1038; G06N 3/08
See application file for complete search history.

(56) References Cited

U.S. PATENT DOCUMENTS

| | | | |
|---|---|---|---|
| 2003/0201894 A1* | 10/2003 | Li | G08B 23/00 340/573.1 |
| 2015/0121255 A1* | 4/2015 | Lee | H04L 51/046 |
| 2017/0102700 A1 | 4/2017 | Kozak | |
| 2018/0128641 A1* | 5/2018 | Kashiwagi | G01C 22/006 |
| 2018/0266834 A1 | 9/2018 | Cronin et al. | |
| 2020/0070657 A1* | 3/2020 | Kim | B60K 28/06 |
| 2020/0290647 A1 | 9/2020 | Anderson | |
| 2021/0174669 A1* | 6/2021 | Guan | G08G 1/0133 |
| 2021/0403054 A1* | 12/2021 | Kim | B60W 60/00253 |
| 2022/0363283 A1* | 11/2022 | Prill | B60W 50/085 |

FOREIGN PATENT DOCUMENTS

| | | | | |
|---|---|---|---|---|
| EP | 3330825 | | 6/2018 | |
| KR | 102200807 B1 * | | 4/2020 | B60W 30/143 |
| KR | 102200807 | | 1/2021 | |

OTHER PUBLICATIONS

A. Miglani, "Deep learning models for traffic flow prediction in autonomous vehicles: A review, solutions, and challenges" 2019 (Year: 2019).*
[No Author Listed], "SAE; Surface Vehicle Recommended Practice, Taxonomy and Definitions for Terms Related to Driving Automation Systems for On-Road Motor Vehicles," SAE International, Sep. 30, 2016, 30 pages.

* cited by examiner

*Primary Examiner* — Russell Frejd
*Assistant Examiner* — Brittany Renee Peko
(74) *Attorney, Agent, or Firm* — Fish & Richardson P.C.

(57) ABSTRACT

Provided are methods for operating a vehicle, which can include receiving, from one or more of at least one sensor placed within a vehicle or an application on a communication device connected to the vehicle, data indicative of at least one of an action or an appearance of a passenger of the vehicle; determining, based on the at least one of the action or the appearance, that a modification of at least one operational parameter of the vehicle is required; and modifying, in response to the determining, the at least one operational parameter of the vehicle. Systems and computer program products are also provided.

12 Claims, 9 Drawing Sheets

OPERATING A VEHICLE

BACKGROUND

Autonomous vehicles (AVs) can be used to transport people from one location to another. As an example, an AV can navigate to the location of a person, waiting for the personal to board the AV, and traverse to the specified destination (e.g., a location selected by the person).

DETAILED DESCRIPTION

Figure 1:
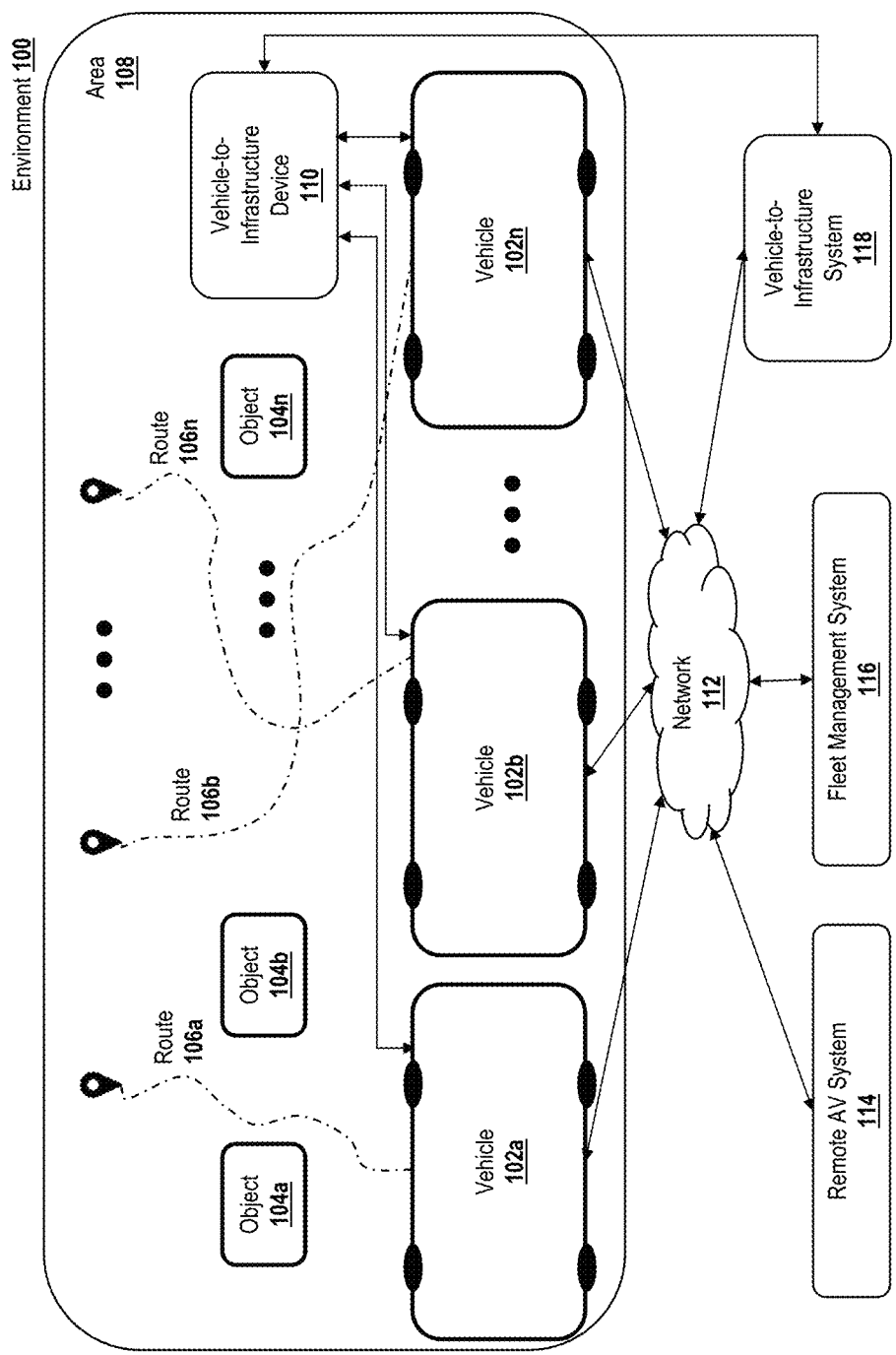
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a system for operating a vehicle based on feedback from in-vehicle sensor and//or an application installed on a passenger's communication device.

In an example embodiment, a system of a vehicle (e.g., autonomous vehicle) detects signals from in-vehicle sensors and/or an application installed on a passenger's communication device (e.g., phone) in communication with the vehicle, and uses those signals to modify at least one operational parameter (e.g., route or speed) of the vehicle to enhance convenience of the passenger.

For example, the system of the vehicle determines that the passenger is starting a video call, and in response the system of the vehicle causes the vehicle to decelerate until vibration within the vehicle reduces or modifies the route to a smoother route (e.g., a route with a smoother material, such as asphalt instead of gravel).

In another example, the system of the vehicle determines that the passenger is sleeping or relaxing, and in response the system of the vehicle causes the vehicle to decelerate until vibration within the vehicle reduces. Additionally, or alternatively, the system of the vehicle can cause modification of the route the vehicle is traveling along, resulting in a smoother route than the vehicle was previously traveling along.

In yet another example, the system of the vehicle determines that the passenger needs to be in a meeting during the route, and in response the system of the vehicle selects a route that has the best internet connectivity among available routes.

In one example, the system of the vehicle determines that the passenger is going to an event (e.g., by detecting that the person is wearing a formal garment or suit and inferring that the passenger is going to a meeting), and in response the system of the vehicle causes the vehicle to accelerate. Additionally, or alternatively, the system of the vehicle may select a faster route.

By virtue of the implementation of systems, methods, and computer program products described herein, a vehicle can be operated more efficiently and/or more effectively. A system of a vehicle can modify an action of the vehicle based on actions and/or appearance of the passenger. Such modification can advantageously enhance the convenience of a passenger, and that too without requiring constant or multiple user inputs indicating a preference of the passenger. This advantageously allows for simpler graphical user interfaces of an application that the passenger uses for riding the vehicle. A simpler graphical user interface minimizes computational bugs and errors, reduces redundant communication and enables a more optimal use of the bandwidth while the passenger is using the application and/or while the application communicates with the vehicle. Simpler graphical user interfaces can be more user friendly, increase engagement and retention of users (including the passenger) of the application, require less computational resources such as storage (which can include memory as well as databases), lower computational costs for addressing customer queries, decrease time taken to return search results or browse various features of the application, and/or the like. In addition, installment of multiple discrete sensors at various locations in the vehicle can provide many benefits, including easier and simultaneous access of different data (e.g. actions and/or appearance of the passenger), and high speed with which optimization (e.g. modification of route and/or speed) can be performed because input data is being acquired quickly by sensors operating in parallel.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
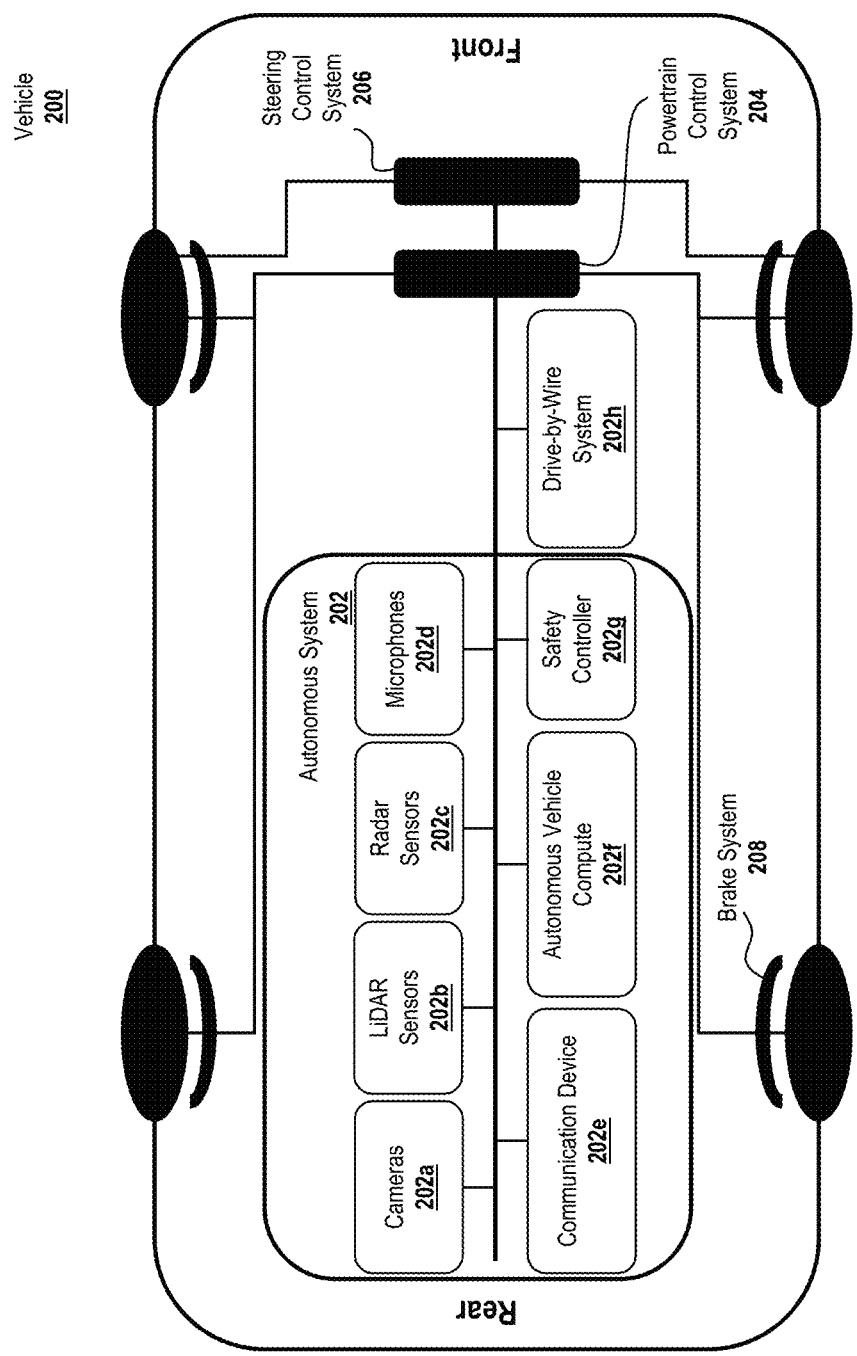
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
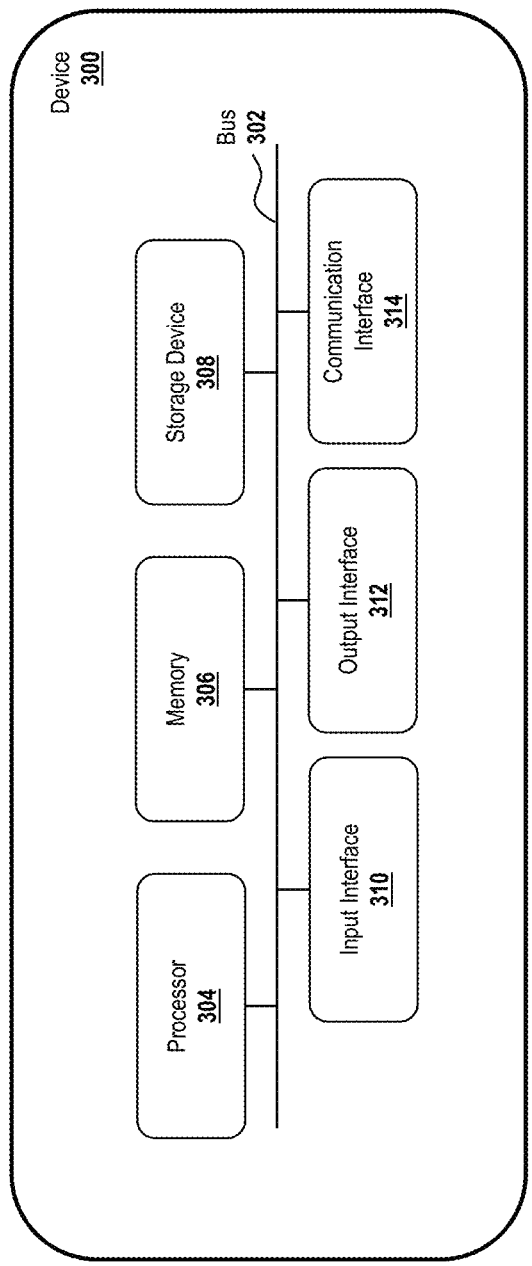
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102), remote AV system 114, fleet management system 116, V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
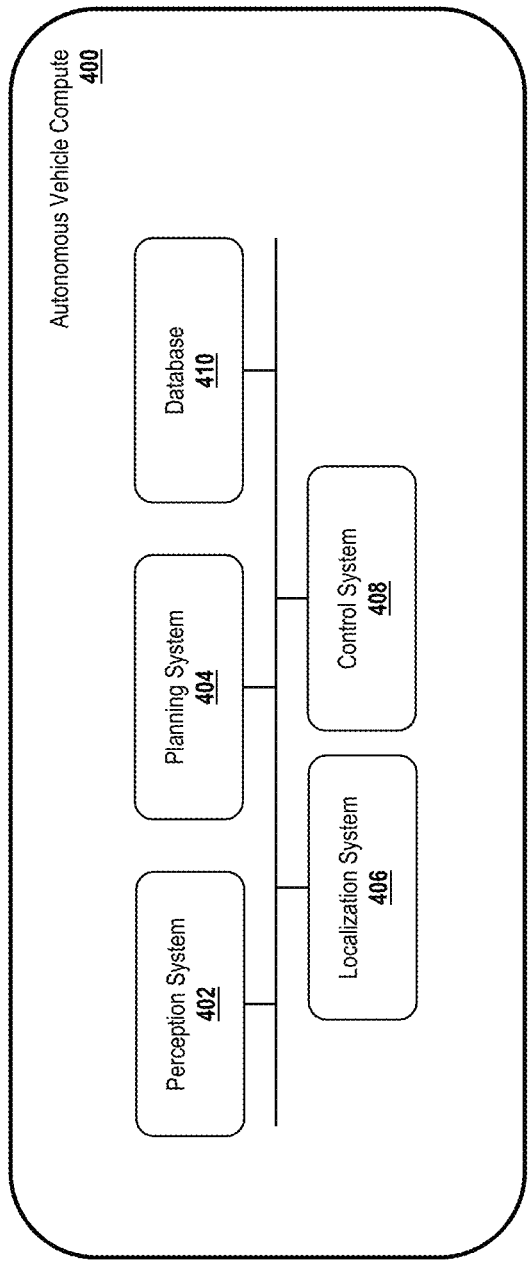
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 6A-6C.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
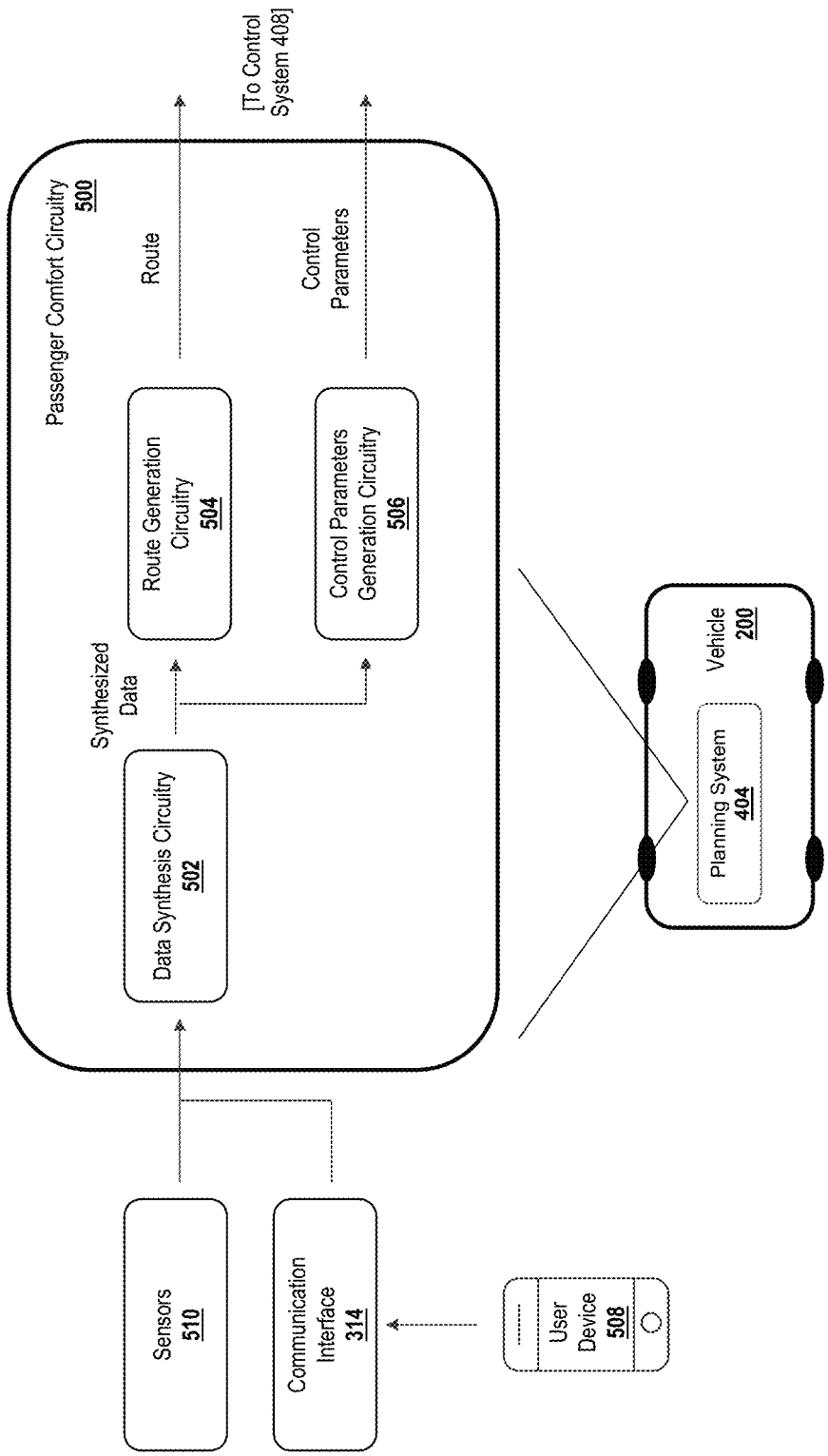
FIG. 5 is a diagram of an example passenger comfort circuitry.

Referring now to FIG. 5, illustrated is an example passenger comfort circuitry 500 for controlling the operation of a vehicle 200 (e.g., an autonomous vehicle). In some embodiments, the passenger comfort circuitry 500 can be included in or otherwise implemented as a part of the planning system 404 of the vehicle 200 (e.g., as shown in FIG. 5). In some embodiments, the passenger comfort circuitry 500 can be implemented as a component of the vehicle 200 that is separate from the planning system 404 (e.g., implemented as an additional system in the autonomous vehicle compute 400). In some embodiments, the passenger comfort circuitry 500 can be implemented as a component that is separate from the vehicle 200 (e.g., implemented as one or more remote computers, such as a cloud computing environment, remote AV system 114, and/or the like).

In general, the passenger comfort circuitry 500 is configured to receive information regarding one or more passengers of the vehicle 200, determine one or more characteristics of the passenger, and generate signals that control the operation of the vehicle 200 based on the determined characteristics. In some embodiments, the passenger comfort circuitry 500 can select a route or modify a previously selected route for the vehicle 200 in enhance the convenience of the passengers. In some embodiments, the passenger comfort circuitry 500 can select control parameters or modify previously selected control parameters for the vehicle 200 in enhance the convenience of the passengers.

As an example, the passenger comfort circuitry 500 can receive sensor measurements obtained by one or more sensors 510. In some embodiments, the sensors 510 can include one or more of the sensors 202*a*-202*d* described with reference to FIG. 2. For example, the sensors 510 can include one or more cameras, LiDAR sensors, radar sensors, and microphones.

In some embodiments, at least some of the sensors 510 can be configured to obtain measurements regarding the interior of the vehicle 200, including measurements regarding any passengers and/or objects positioned within the interior of the vehicle 200. As an example, the sensors 510 can include at least one camera directed to an interior of the vehicle 200, and configured to capture images and/or videos representing passengers and/or objects within the interior of the vehicle 200. As another example, the sensors 510 can include at least one LiDAR sensor directed to the interior or the vehicle 200, and configured to capture images and/or point clouds representing passengers and/or objects within the interior of the vehicle 200. As another example, the sensors 510 can include at least one radar sensor directed to the interior of the vehicle 200, and configured to capture radar images representing passengers and/or objects within the interior of the vehicle 200. As another example, the sensors 510 can include at least one microphone configured to capture audio signals representing sounds that are audible within the interior of the vehicle 200 (e.g., such as sounds produced by passengers and/or objects within the interior of the vehicle 200 and/or exterior sounds that propagate into the vehicle 200).

In some embodiments, the sensors 510 can also include one or more sensors configured to measure vital signs of passengers within the interior of the vehicle 200. As an example, sensors 510 can include one or more breath sensors (e.g., to measure a respiration rate or breathing rate of a passenger), heart rate sensors (e.g., to measure a heart rate of a passenger), and/or temperature or thermal sensors (e.g., to measure a temperature of a passenger).

In some embodiments, the sensors 510 can also include one or more sensors configured to track a passenger's eye position and movement. As an example, sensors 510 can include one or more eye tracking sensors configured to determine a passenger's gaze, and changes to the passenger's gaze over time.

In some embodiments, the sensors 510 can also include one or more sensors configured to measure vibrations in the interior of the vehicle 200. As an example, sensors 510 can include accelerometers configured to measure vibrations, such as those caused by the operation of the powertrain of the vehicle 200, the movement of the vehicle 200 along the ground, etc.

In some embodiments, the passenger comfort circuitry 500 can also receive additional data via the communications interface 314 (e.g., as described with reference to FIG. 3).

As an example, the passenger comfort circuitry 500 can receive data from a user device 508 carried by a passenger of the vehicle 200 via the communications interface 314. Example user devices include smart phones, computers (e.g., laptop computers), tablets, and wearable devices (e.g., smart watch, headsets, etc.). In some embodiments, the data can be received from the user device 508 via one or more Ethernet links, optical links, coaxial links, infrared links, RF links, USB links, Wi-Fi® links, and/or cellular network links.

In some embodiments, the user device 508 can provide data regarding one or more events associated with a passenger of the vehicle 200 (e.g., one or more event items stored on a calendar application of the user device 508), including the time at which each of the events is scheduled and a location of the event.

In some embodiments, the user device 508 can provide data regarding communications between the passenger and another entity (e.g., one or more emails, text messages, chat messages, telephone calls, video calls, etc.).

In some embodiments, the user device 508 can provide sensor data regarding the passenger (e.g., sensor information similar to the sensor information generated by the sensors 510). As an example the user device 508 can obtain acceleration measurements (e.g., using an acceleration sensor included in the user device 508), and provide the measurements to the passenger comfort circuitry 500. As an example the user device 508 can obtain acceleration measurements (e.g., using an acceleration sensor included in the user device 508), and provide the measurements to the passenger comfort circuitry 500. As another example the user device 508 can obtain one or more images and/or videos of the passenger (e.g., using a camera included in the user device 508), and provide the images and/or videos to the passenger comfort circuitry 500. As another example the user device 508 can obtain one or more LiDAR images of the passenger (e.g., using a LiDAR sensor included in the user device 508), and provide the LiDAR images and/or videos to the passenger comfort circuitry 500. As another example the user device 508 can obtain one or more audio signals (e.g., using a microphone included in the user device 508), and provide the audio signals to the passenger comfort circuitry 500.

In some embodiments, the at least some of the data that is provided by the user device 508 to the passenger comfort circuitry 500 can be collected and transmitted using a user-installable application installed on the user device 508 (e.g., an "app"), such as a native application or a browser application. In some implementations, the application can be used by a passenger to plan trips using the vehicle 200 (e.g., by submitting a request to board the vehicle 200 at a particular location and travel to a particular destination). Further, the application can be used to collect data during the trip (e.g., one or all of the data described above), and provide the collected data to the passenger comfort circuitry 500.

As another example, the passenger comfort circuitry 500 can receive data from one or more external data sources. For instance, the passenger comfort circuitry 500 can receive weather data regarding one or more geographical locations. As another example, the passenger comfort circuitry 500 can receive traffic data regarding one or more routes. As another example, the passenger comfort circuitry 500 can receive road condition data regarding one or more roads (e.g., information regarding the quality of a road's surface, such as the roughness or smoothness of the road's surface, the prevalence of potholes or flaws in the road's surface, etc.). As another example, the passenger comfort circuitry 500 can receive network data regarding one or more wireless networks (e.g., information regarding the coverage, network quality, etc. of a wireless network at one or more geographical locations), such as a network "coverage map." As another example, the passenger comfort circuitry 500 can receive point of interest data, such as data regarding the locations of particular points of interest (e.g., landmarks, parks, scenic points, etc.) and/or user reviews regarding those points of interest (e.g., reviews indicating whether the points of interest are favorably or unfavorably rated by others).

Another example, the passenger comfort circuitry 500 can receive data regarding the quality of one or more network links presently and/or previously established using the communication interface 314. For example, the passenger comfort circuitry 500 can receive information regarding a signal strength of wireless signals received from a wireless network (e.g., RF signals, cellular signals, etc.), a bandwidth or throughput of data transmissions using the wireless network, a latency of data transmission using the wireless network, etc.

The passenger comfort circuitry 500 provides at least some of the data received from the sensors 510, the communication interface 314, and/or the user device 508 to a data synthesis circuitry 502. The data synthesis circuitry 502 processes the received data, and determines one or more characteristics of the vehicle 200 and/or the passenger(s) of the vehicle 200.

As an example, the data synthesis circuitry 502 can determine one or more actions being performed by the passenger(s) of the vehicle 200. Example actions include sitting, sleeping, lying down, applying makeup or other cosmetics, taking out and/or putting on earphones, taking out a device (e.g., the user device 508), and operating the device (e.g., viewing content on the device, inputting commands into the device, etc.). Further example actions include speaking on a telephone, participating in a video conference, giving a presentation, etc. (e.g., using the user device 508).

As another example, the data synthesis circuitry 502 can determine one or more poses of the passenger(s) of the vehicle 200. For example, the data synthesis circuitry 502 can determine the location and/or orientation of one or more body parts of a passenger, such as the passenger's head, arms, hands, fingers, legs, feet, torso, etc.

As another example, the data synthesis circuitry 502 can determine one or more physical gestures (e.g., movements of one or more body parts) performed by the passenger(s) of the vehicle 200. For example, the data synthesis circuitry 502 can determine movements of the user's head, arms, hands, fingers, legs, feet, etc.

As another example, the data synthesis circuitry 502 can determine one or more vital signs of the passenger(s) of the vehicle 200. Example vital signs include a temperature of a passenger, a breath rate or respiration rate of a passenger, and a heart rate of a passenger. In some implementations, the data synthesis circuitry 502 can determine a passenger's breath rate or respiration rate based on measurement data indicating the movements of the passenger's chest over time (e.g., based on images, videos, point clouds, etc. representing the passenger over time).

As another example, the data synthesis circuitry 502 can determine a passenger's facial expressions. Example facial expression include smiling, frowning, staring, etc.

As another example, the data synthesis circuitry 502 can determine a passenger's gaze (e.g., whether the user is looking out of a window of the vehicle 200, looking at another passenger in the vehicle 200, looking at the user device 508, etc.).

As another example, the data synthesis circuitry 502 can determine a passenger's attire. For example, the data synthesis circuitry 502 can determine the whether a passenger is wearing a shirt, pants, a hat, a dress, a skirt, shorts, socks, eyewear (e.g., corrective glasses, sunglasses, etc.), and/or any other garment. Further, the data synthesis circuitry 502 can determine the style or type of the passenger's attire (e.g., whether the garment is formal attire, business attire, casual attire, athletic attire, swimwear, a uniform, etc.).

As another example, the data synthesis circuitry 502 can determine an emotional state of passenger(s) of the vehicle 200. For example, the data synthesis circuitry 502 can determine a facial expression, vital signs, and/or a speech pattern of a passenger, and based on this information, determine whether a user is happy, sad, anxious, angry, frightened, surprised, or experiencing some other emotion.

In some embodiments the data synthesis circuitry 502 can make at least some of the determinations described herein based on one or more machine learning models. For example, a machine learning model can be trained to receive input data (e.g., data received from the sensors 510, the communication interface 314, and/or the user device 508), and, based on the input data, generate output data associated with one or more predictions regarding the characteristics of the passenger(s) of the vehicle 200 and/or the vehicle 200.

As an example, a machine learning model can be trained using training data regarding one or more passengers. For each passenger, the training data can include input information similar to that described with reference to FIG. 5. For example, the training data can include data obtained by one or more sensors (e.g., sensor measurements of that passenger, the interior of the vehicle in which the passenger was traveling. As another example, the training data can include data obtained one a communications interface, such as data obtained from that user's devices, data obtained from external data sources, data regarding a quality of one or more network links, etc.

Further, for each passenger, the training data can include a route and/or a set of control parameters that were generated to instruct the vehicle to travel to the passenger's intended destination. Further, the training data can include information regarding the comfort of the passenger. For example, a high comfort metric can indicate that the passenger was comfortable while traveling in the vehicle (and thus, the route and/or set control of parameters may have been suitable to control the vehicle under the circumstances), whereas a low comfort metric can indicate that the passenger was not comfortable while traveling in the vehicle (and thus, the route and/or set control of parameters may not have been suitable to control the vehicle under the circumstances).

Based on the training data, the machine learning model can be trained to identify correlations, relationships, and/or trends between (i) the input data, (ii) the routes and/or sets of control parameters that can be generated based on the input data, and (iii) the comfort of a passenger upon the vehicle operating according to those routes and/or sets of control parameters. Further, the machine learning model can be trained to select a route and/or a set of control parameters that maximizes (or otherwise increases) a passenger's comfort, given a particular circumstance or situation.

Figure 6A:
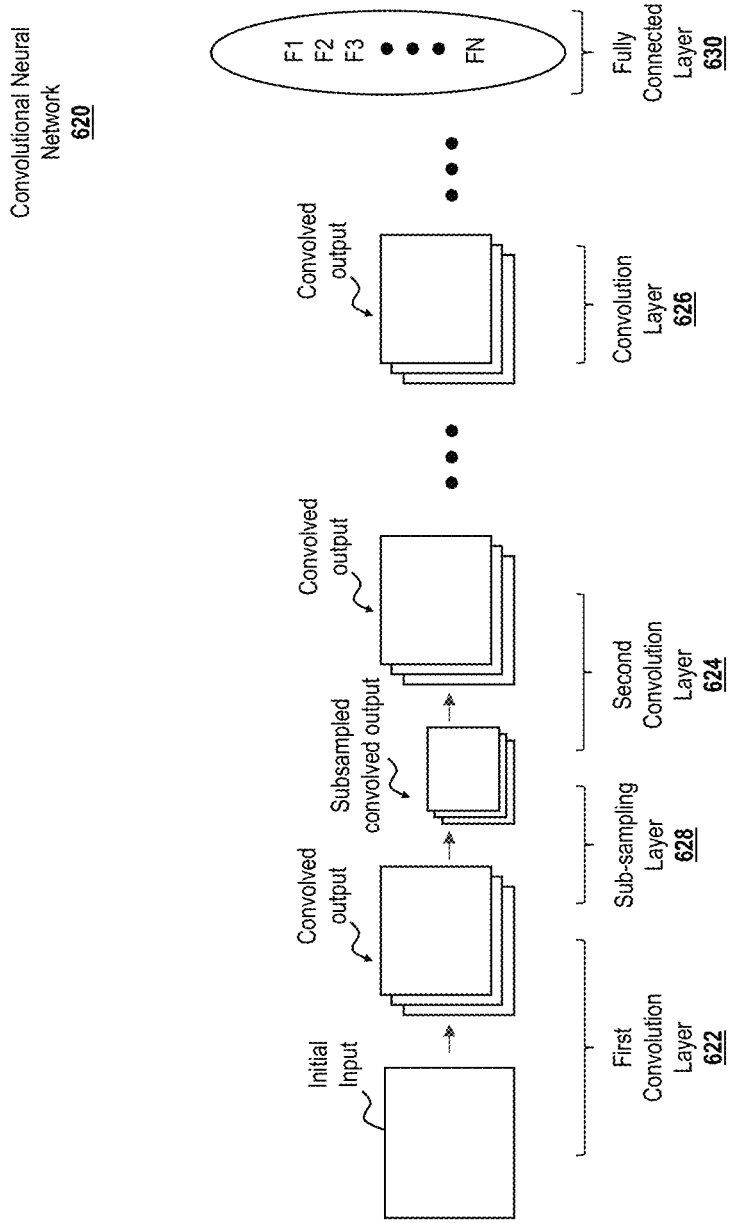
FIG. 6A is a diagram of an implementation of a neural network.

Example machine learning models are described in further detail with reference to FIGS. 6A-6C.

The data synthesis circuitry 502 provides at least some of the determined information (e.g., "synthesized data") to a route generation circuitry 504 and/or a control parameters generation circuitry 506. Based in the synthesized data, the route generation circuitry 504 generates one or more routes for navigating the vehicle 200 to its destination (e.g., as described with reference to FIGS. 1 and 4). Further, the control parameter generation circuitry 506 generates one or more control parameters that regulate the operation of the vehicle 200 based on the determined information. Control parameters can include, for example, a constraints regarding the speed, acceleration, braking rate, turning rate, and/or other parameters for operating the vehicle 200. The routes and/or control parameters are provided to the control system 408 for execution (e.g., as described with reference to FIG. 4).

For instance, based on the synthesized data received from the data synthesis circuitry 502, the route generation circuitry 504 and the control parameter generation circuitry 506 can generate a route and a set of control parameters, respectively, that enhance the convenience of the passenger. As an example, a route and a set of control parameters can be generated to enhance the passengers comfort as the vehicle 200 navigates to its destination. As another example, a route and a set of control parameters can be generated to facilitate the passenger in performing certain actions (e.g., sleeping, talking on the phone, participating in a video conference, etc.) as the vehicle 200 navigates to its destination. As another example, a route and a set of control parameters can be generated to selectively expedite a passenger's travel to the destination.

In some embodiments, the routes and/or controls parameters that are generated by the route generation circuitry 504 and/or the control parameters generation circuitry 506 can modify a prior operation of the vehicle 200 (e.g., by replacing, supplementing, and/or modifying a prior route and/or a set of control parameters for the vehicle 200). As an example, based on the information received from the data synthesis circuitry 502, the route generation circuitry 504 and the control parameter generation circuitry 506 can generate a modified route and/or a modified set of control parameters that improves the passengers comfort as the vehicle 200 navigates to its destination. As another example, a modified route and/or a modified set of control parameters can be generated to improve the passenger's ability to perform certain actions as the vehicle 200 navigates to its destination. As another example, a modified route and/or a modified set of control parameters can be generated to decrease the travel time of the passenger to the destination.

In some embodiments, the data synthesis circuitry 502 can determine, based on the data received from the sensors 510, the communication interface 314, and/or the user device 508, that the passenger(s) of the vehicle 200 would prefer to prioritize reaching the destination quickly over ride quality or passenger comfort. Based on this determination, the route generation circuitry 504 can select a route to the destination that prioritizes a shorter travel time (e.g., by selecting a route that minimizes or otherwise reduces travel time, with a potential tradeoff that a road having a rougher surface, a greater number of turns, and/or more sudden turns may be selected). Further, the control parameters generation circuitry 506 can select a set of control parameters that prioritizes a shorter travel time. For example, the set of control parameters can enable the vehicle 200 to change its acceleration, braking rate, and/or turning rate, etc. more quickly. As another example, the set of control parameters can enable the vehicle 200 travel at greater speeds (e.g., up to a particular maximum speed).

In some embodiments, the data synthesis circuitry 502 can determine, based on the data received from the sensors 510, the communication interface 314, and/or the user device 508, that the passenger(s) of the vehicle 200 would prefer to prioritize a ride quality or passenger comfort over reaching the destination quickly. Based on this determination, the route generation circuitry 504 can select a route to the destination that prioritizes a higher ride quality or passenger comfort (e.g., by selecting a route that includes roads with smoother road surfaces, fewer turns, less sudden turns, etc., with a potential tradeoff that the travel time may be increased). Further, the control parameters generation circuitry 506 can select a set of control parameters that prioritizes a higher ride quality. For example, the set of control parameters can limit the vehicle 200 to limit its acceleration, braking rate, turning rate, etc. to a particular range. As another example, the set of control parameters can limit the speed of the vehicle 200 to a lower range of speeds.

Ride quality and passenger comfort can depend various criteria. For example, ride quality and passenger comfort can depend on the level or intensity of vibration in the vehicle 200. For instance, higher intensity vibrations can correspond to lower ride quality or passenger comfort, whereas lower intensity vibrations can correspond to higher ride quality or passenger comfort.

As another example, ride quality and passenger comfort can depend on the relative movement of passengers within the vehicle 200 (e.g., due to accelerations, declarations, turns, etc.). For instance, a greater degree of movement can correspond to lower ride quality or passenger comfort, whereas a lesser degree of movement can correspond to higher ride quality or passenger comfort.

As another example, ride quality and passenger comfort can depend on the frequency in which the vehicle 200 stops or slows down (e.g., due to traffic, intersections, traffic signals, etc.). For instance, a higher frequency or stops or slowdowns can correspond to lower ride quality or passenger comfort, whereas a lower frequency or stops or slowdowns can correspond to higher ride quality or passenger comfort.

As another example, ride quality and passenger comfort can depend on the availability and quality of a network connection (e.g., a cellular connection) along a route. For instance, poor network coverage and/or a poor quality network connection can correspond to lower ride quality or passenger comfort, whereas good network coverage and/or a high quality network connection can correspond to higher ride quality or passenger comfort.

As another example, ride quality and passenger comfort can depend on the brightness within the vehicle 200 along a route. For instance, low brightness within the vehicle 200 (e.g., due to tunnels) can correspond to lower ride quality or passenger comfort, whereas a higher brightness can correspond to higher ride quality or passenger comfort.

As another example, ride quality and passenger comfort can depend on the degree of privacy within the vehicle 200 along a route. For instance, a low degree of privacy (e.g., due to the presence of or a high frequency of crowds, pedestrians, other vehicles, roadside cameras, etc.) can correspond to lower ride quality or passenger comfort, whereas a higher degree of privacy (e.g., due to an absence of or a lower frequency of crowds, pedestrian, other vehicles, roadside cameras, etc.) can correspond to higher ride quality or passenger comfort.

As another example, ride quality and passenger comfort can depend on the views from the vehicle 200 along a route. For instance, views that are more pleasant (e.g., scenic or touristic views, such as views of landmarks, landscapes, scenic points, and other points of interest, etc.) can correspond to higher ride quality or passenger comfort, whereas views that are less pleasant (e.g., views without scenic or touristic views) can correspond to higher ride quality or passenger comfort.

As another example, ride quality and passenger comfort can depend on user reviews of the points of interest that are visible from the vehicle 200 along the route. For instance, views of points of interview that are favorably rated by other users can correspond to higher ride quality or passenger comfort, whereas views that are unfavorably rated by other users can correspond to higher ride quality or passenger comfort.

As another example, ride quality and passenger comfort can depend on the amount of noise that propagates into the vehicle 200 along the route (e.g., noises generated by the vehicle 200 itself, or noises generated external to the vehicle 200 and that propagate into the vehicle 200). For instance, loud noises can correspond to lower ride quality or passenger comfort, whereas softer noises (or the absence or noise) can correspond to higher ride quality or passenger comfort.

In general, the passenger comfort circuitry 500 can select routes and/or sets of control parameters that balance (i) travel time and (ii) ride quality or passenger comfort.

As an example, the data synthesis circuitry 502 can determine, based on the data received from the sensors 510, the communication interface 314, and/or the user device 508, that the passenger(s) of the vehicle 200 is performing an action that utilities a network connection (e.g., a network connection to a wireless network). For instance, the data synthesis circuitry 502 can determine that the user is speaking on a telephone, participating in a video conference, or operating a device that sends and/or receives data via a wireless network. In some embodiments, this determination can be made based on sensor data indicating that the user has taken out an electronic device (e.g., the user device 508), sensor data indicating that the user is interacting with the device (e.g., viewing constant displayed on a display, typing on a keyboard, tapping on a touch sensitive display, etc.), sensor data indicating that the user has raised a device to his ear, sensor data indicating that the user has taken out and/or put on earphones, and/or sensor data indicating that the user has started speaking (e.g., when no other passenger is in the vehicle). Based on this determination, the route generation circuitry 504 and the control parameters generation circuitry 506 can select a route to the destination that prioritizes network coverage and network quality along the route. Further, the route generation circuitry 504 and the control parameters generation circuitry 506 select a route and/or a set of control parameters that minimizes (or otherwise reduces) vibrations, noise, and/or sudden changes in speed, acceleration, braking, turning, etc., such that the user is not disturbed. For example, the user can speak on the telephone, participate in a video conference, or operate a device with fewer interruptions.

As another example, the data synthesis circuitry 502 can determine, based on the data received from the sensors 510, the communication interface 314, and/or the user device 508, that the passenger(s) of the vehicle 200 is sleeping or relaxing. For instance, the data synthesis circuitry 502 can determine that the user is laying down, breathing slowly (e.g., below a particular preset or predetermined threshold value), not moving (or not moving frequently), has a slow heart rate (e.g., below a particular preset or predetermined threshold value), and/or has closed her eyes. Based on this determination, the route generation circuitry 504 and the control parameters generation circuitry 506 select a route and/or a set of control parameters that minimizes (or otherwise reduces) vibrations, noise, and/or sudden changes in speed, acceleration, braking, turning, etc.

As another example, the data synthesis circuitry 502 can determine, based on the data received from the sensors 510, the communication interface 314, and/or the user device 508, that the passenger(s) of the vehicle 200 is applying makeup or other cosmetics. Based on this determination, the route generation circuitry 504 and the control parameters generation circuitry 506 can select a route and/or a set of control parameters that minimizes (or otherwise reduces) vibrations and/or sudden changes in speed, acceleration, braking, turning, etc. In some embodiments, the passenger comfort circuitry 500 can instruct the vehicle 200 to stop traveling on the route (e.g., by pulling over into a safe stopping place) until the passenger has finished applying makeup.

As another example, the data synthesis circuitry 502 can determine, based on the data received from the sensors 510, the communication interface 314, and/or the user device 508, that the passenger(s) of the vehicle 200 are scheduled to attend an event at a particular time. For example, the data synthesis circuitry 502 can retrieve calendar data indicating that the passenger is scheduled to attend an event at the destination at a particular day and time, and that the day and time are close in time to the estimated arrival time of the vehicle 200 at the destination. As another example, the data synthesis circuitry 502 can determine that the passenger is wearing business attire (e.g., a business suit). As another example, the data synthesis circuitry 502 can determine that the passenger is anxious or angry (e.g., based on her facial expressions, speaking tone, etc.). Based on this determination, the route generation circuitry 504 and the control parameters generation circuitry 506 can select a route and/or a set of control parameters that increases the likelihood that the user will arrive at the event on time. For example, the route generation circuitry 504 a can select a route that reduces the travel time to the destination. As another example, the control parameters generation circuitry 506 can enable the vehicle 200 to change its acceleration, braking rate, and/or turning rate, etc. more quickly. As another example, the set of control parameters can enable the vehicle 200 travel at greater speeds (e.g., up to a particular maximum speed). Further, the route and/or the set of control parameters can be selected such that a degree of vibration and/or noise may be experienced within the vehicle 200.

As another example, the data synthesis circuitry 502 can determine, based on the data received from the sensors 510, the communication interface 314, and/or the user device 508, that the passenger(s) of the vehicle 200 is wearing formal attire (e.g., a suit, a tuxedo, a dress, a gown, etc.). Further, the data synthesis circuitry 502 can determine the time of day. Based on this information, the route generation circuitry 504 and the control parameters generation circuitry 506 can select a route and/or a set of control parameters that either (i) increases the likelihood that the user will arrive at the event on time, or (ii) prioritizes other ride comfort factors (e.g., reducing vibration, maximum speed, acceleration, braking rate, turning rate, etc.). For example, if a passenger is wearing formal attire earlier in the day (e.g., during the day time), this may suggest that the passenger is headed to an event and would prefer to arrive at the destination as quickly as possible. Accordingly, the route generation circuitry 504 and the control parameters generation circuitry 506 can select a route and/or a set of control parameters in a way that prioritizes a short travel time, while permitting a greater degree of vibration, acceleration, braking rate, turning rate, etc. As another example, if a passenger is wearing formal attire later in the day (e.g., during the evening), this may suggest that the passenger is returning from an event and is not in a rush. Accordingly, the route generation circuitry 504 and the control parameters generation circuitry 506 can prioritize ride comfort factors over travel time.

As another example, the data synthesis circuitry 502 can determine that the passenger is anxious or angry (e.g., based on her facial expressions, speaking tone, etc.). Based on this determination, the route generation circuitry 504 and the control parameters generation circuitry 506 can select a route and/or a set of control parameters that increases the likelihood that the user will arrive at the event on time. For example, the route generation circuitry 504 a can select a route that reduces the travel time to the destination. As another example, the control parameters generation circuitry 506 can enable the vehicle 200 to change its acceleration, braking rate, and/or turning rate, etc. more quickly. As another example, the set of control parameters can enable the vehicle 200 travel at greater speeds (e.g., up to a particular maximum speed). Further, the route and/or the set of control parameters can be selected such that a degree of vibration and/or noise may be experienced within the vehicle 200.

At least some of the techniques describe herein can be implemented using one or more machine learning models. As an example, FIG. 6A shows a diagram of an implementation of a machine learning model. More specifically, illustrated is a diagram of an implementation of a convolutional neural network (CNN) 620. For purposes of illustration, the following description of CNN 620 will be with respect to an implementation of CNN 620 by the passenger comfort circuitry 500. However, it will be understood that in some examples CNN 620 (e.g., one or more components of CNN 620) is implemented by other systems different from, or in addition to, the passenger comfort circuitry 500, such as perception system 402, planning system 404, localization system 406, and/or control system 408. While CNN 620 includes certain features as described herein, these features are provided for the purpose of illustration and are not intended to limit the present disclosure.

CNN 620 includes a plurality of convolution layers including first convolution layer 622, second convolution layer 624, and convolution layer 626. In some embodiments, CNN 620 includes sub-sampling layer 628 (sometimes referred to as a pooling layer). In some embodiments, sub-sampling layer 628 and/or other subsampling layers have a dimension (i.e., an amount of nodes) that is less than a dimension of an upstream system. By virtue of sub-sampling layer 628 having a dimension that is less than a dimension of an upstream layer, CNN 620 consolidates the amount of data associated with the initial input and/or the output of an upstream layer to thereby decrease the amount of computations necessary for CNN 620 to perform downstream convolution operations. Additionally, or alternatively, by virtue of sub-sampling layer 628 being associated with (e.g., configured to perform) at least one subsampling function (as described below with respect to FIGS. 6B and 6C), CNN 620 consolidates the amount of data associated with the initial input.

The passenger comfort circuitry 500 performs convolution operations based on the passenger comfort circuitry 500 providing respective inputs and/or outputs associated with each of first convolution layer 622, second convolution layer 624, and convolution layer 626 to generate respective outputs. In some examples, the passenger comfort circuitry 500 implements CNN 620 based on the passenger comfort circuitry 500 providing data as input to first convolution layer 622, second convolution layer 624, and convolution layer 626. In such an example, the passenger comfort circuitry 500 provides the data as input to first convolution layer 622, second convolution layer 624, and convolution layer 626 based on the passenger comfort circuitry 500 receiving data from one or more different systems (e.g., the sensors 510, communications interface 314, and/or the user device 508). A detailed description of convolution operations is included below with respect to FIG. 6B.

In some embodiments, the passenger comfort circuitry 500 provides data associated with an input (referred to as an initial input) to first convolution layer 622 and the passenger comfort circuitry 500 generates data associated with an output using first convolution layer 622. In some embodiments, the passenger comfort circuitry 500 provides an output generated by a convolution layer as input to a different convolution layer. For example, the passenger comfort circuitry 500 provides the output of first convolution layer 622 as input to sub-sampling layer 628, second convolution layer 624, and/or convolution layer 626. In such an example, first convolution layer 622 is referred to as an upstream layer and sub-sampling layer 628, second convolution layer 624, and/or convolution layer 626 are referred to as downstream layers. Similarly, in some embodiments the passenger comfort circuitry 500 provides the output of sub-sampling layer 628 to second convolution layer 624 and/or convolution layer 626 and, in this example, sub-sampling layer 628 would be referred to as an upstream layer and second convolution layer 624 and/or convolution layer 626 would be referred to as downstream layers.

In some embodiments, the passenger comfort circuitry 500 processes the data associated with the input provided to CNN 620 before the passenger comfort circuitry 500 provides the input to CNN 620. For example, the passenger comfort circuitry 500 processes the data associated with the input provided to CNN 620 based on the passenger comfort circuitry 500 and/or the perception system 402 normalizing sensor data (e.g., image data, LiDAR data, radar data, and/or the like).

In some embodiments, CNN 620 generates an output based on the passenger comfort circuitry 500 performing convolution operations associated with each convolution layer. In some examples, CNN 620 generates an output based on the passenger comfort circuitry 500 performing convolution operations associated with each convolution layer and an initial input. In some embodiments, the passenger comfort circuitry 500 generates the output and provides the output as fully connected layer 630. In some examples, the passenger comfort circuitry 500 provides the output of convolution layer 626 as fully connected layer 630, where fully connected layer 620 includes data associated with a plurality of feature values referred to as F1, F2 ... FN. In this example, the output of convolution layer 626 includes data associated with a plurality of output feature values that represent a prediction.

In some embodiments, the passenger comfort circuitry 500 identifies a prediction from among a plurality of predictions based on the passenger comfort circuitry 500 identifying a feature value that is associated with the highest likelihood of being the correct prediction from among the plurality of predictions. For example, where fully connected layer 630 includes feature values F1, F2, ... FN, and F1 is the greatest feature value, the passenger comfort circuitry 500 identifies the prediction associated with F1 as being the correct prediction from among the plurality of predictions. In some embodiments, the passenger comfort circuitry 500 trains CNN 620 to generate the prediction. In some examples, the passenger comfort circuitry 500 trains CNN 620 to generate the prediction based on the passenger comfort circuitry 500 providing training data associated with the prediction to CNN 620.

A prediction can include, for example, a particular predicted route and/or set of control parameters that maximizes (or otherwise increases) a passenger's comfort in a particular circumstance or situation (e.g., as described with reference to the route generation circuitry 504 and the control parameters generation circuitry 506). As another example, a prediction can include a predicted characteristic of the passenger, the vehicle, and/or a network line (e.g., as described with reference to the data synthesis circuitry 502).

Figure 6B:
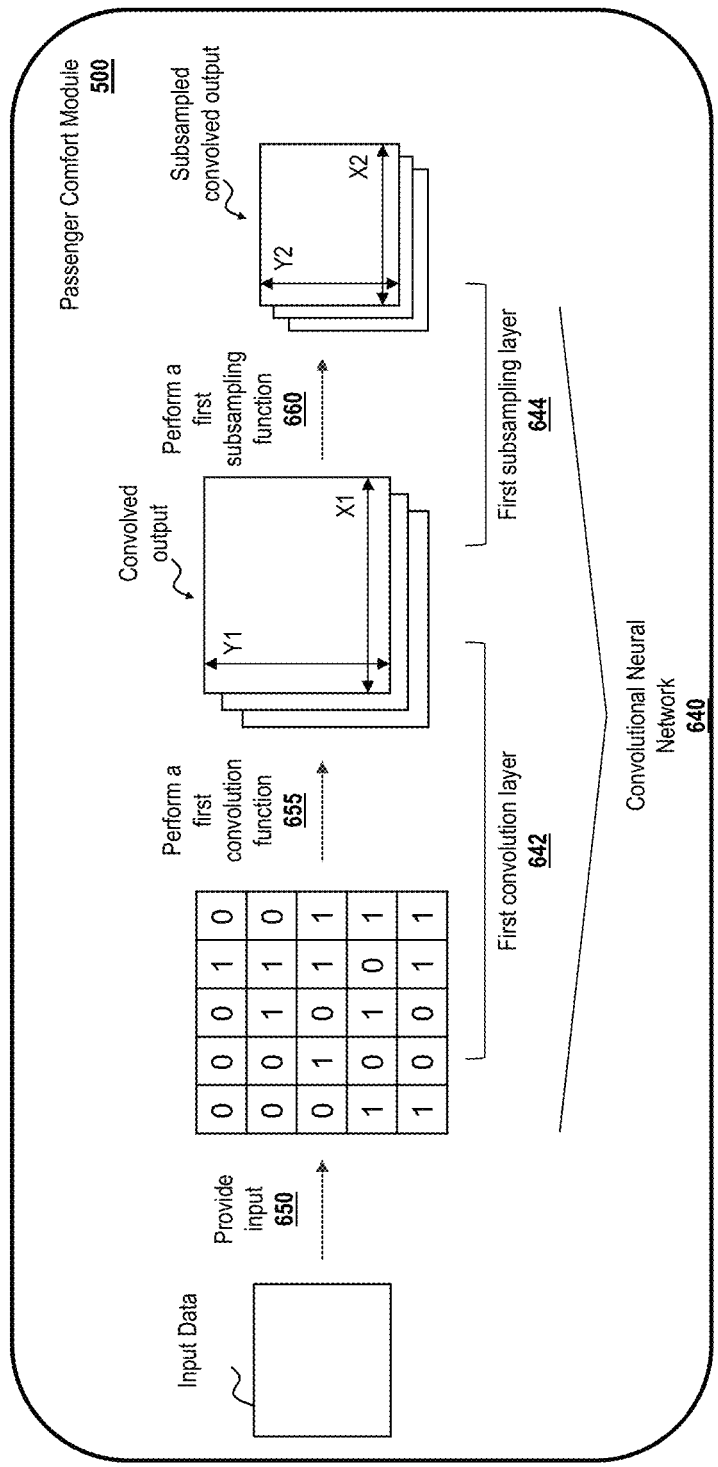
FIGS. 6B and 6C are a diagram illustrating example operation of a CNN.
Figure 6C:
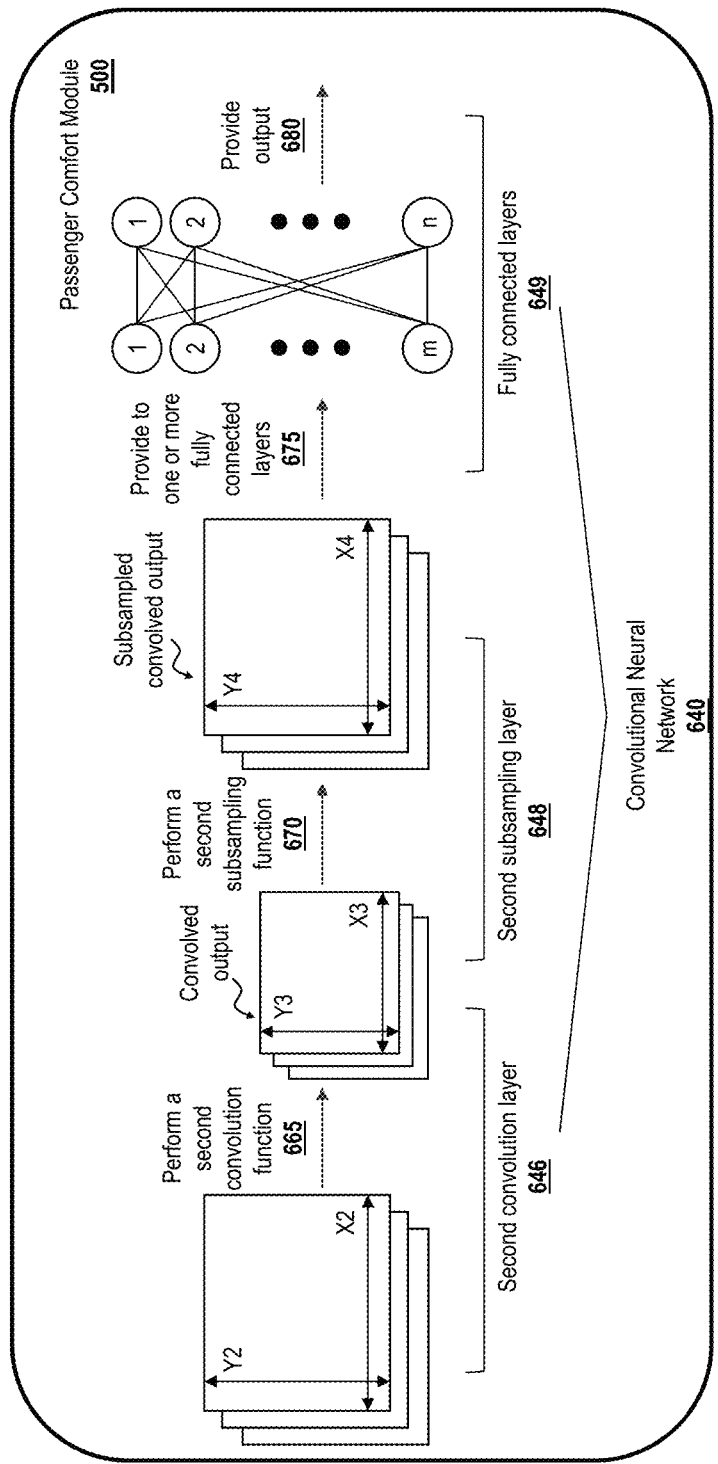

Referring now to FIGS. 6B and 6C, illustrated is a diagram of example operation of CNN 640 by the passenger comfort circuitry 500. In some embodiments, CNN 640 (e.g., one or more components of CNN 640) is the same as, or similar to, CNN 620 (e.g., one or more components of CNN 620) (see FIG. 6A).

At step 650, the passenger comfort circuitry 500 provides data as input to CNN 640 (step 650). For example, the passenger comfort circuitry 500 can provide data obtained by one or more of the sensors 510, such as one or more images, videos, LiDAR images, point clouds, radar images, audio signals, vital signs, eye position and movement measurements, vibration measurements, acceleration measurements, etc.) As another example, the passenger comfort circuitry 500 can provide data received from the communication interface 314 and/or the user device 508.

At step 655, CNN 640 performs a first convolution function. For example, CNN 640 performs the first convolution function based on CNN 640 providing the values representing the input data as input to one or more neurons (not explicitly illustrated) included in first convolution layer 642. As an example, the values representing an image or video can correspond to values representing a region of the image or video (sometimes referred to as a receptive field). As another example, the values representing an audio signal can correspond to values representing a portion or the audio signal (e.g., a particular temporal portion and/or a particular spectral portion). As another example, the values representing some other sensor measurement can correspond to values representing a portion of that sensor measurement (e.g., a particular temporal portion and/or a particular spectral portion).

In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges in an image (e.g., horizontal lines, vertical lines, straight lines, and/or the like). In successive convolution layers, the filters associated with neurons may be configured to identify successively more complex patterns in the image (e.g., arcs, objects, and/or the like). In successive convolution layers, the filters associated with neurons may be configured to identify patterns in other types of data (e.g., audio signals, accelerometer measurements, vital signs, eye tracking and movement measurements, etc.).

In some embodiments, CNN 640 performs the first convolution function based on CNN 640 multiplying the values provided as input to each of the one or more neurons included in first convolution layer 642 with the values of the filter that corresponds to each of the one or more neurons. For example, CNN 640 can multiply the values provided as input to each of the one or more neurons included in first convolution layer 642 with the values of the filter that corresponds to each of the one or more neurons to generate a single value or an array of values as an output. In some embodiments, the collective output of the neurons of first convolution layer 642 is referred to as a convolved output. In some embodiments, where each neuron has the same filter, the convolved output is referred to as a feature map.

In some embodiments, CNN 640 provides the outputs of each neuron of first convolutional layer 642 to neurons of a downstream layer. For purposes of clarity, an upstream layer can be a layer that transmits data to a different layer (referred to as a downstream layer). For example, CNN 640 can provide the outputs of each neuron of first convolutional layer 642 to corresponding neurons of a subsampling layer. In an example, CNN 640 provides the outputs of each neuron of first convolutional layer 642 to corresponding neurons of first subsampling layer 644. In some embodiments, CNN 640 adds a bias value to the aggregates of all the values provided to each neuron of the downstream layer. For example, CNN 640 adds a bias value to the aggregates of all the values provided to each neuron of first subsampling layer 644. In such an example, CNN 640 determines a final value to provide to each neuron of first subsampling layer 644 based on the aggregates of all the values provided to each neuron and an activation function associated with each neuron of first subsampling layer 644.

At step 660, CNN 640 performs a first subsampling function. For example, CNN 640 can perform a first subsampling function based on CNN 640 providing the values output by first convolution layer 642 to corresponding neurons of first subsampling layer 644. In some embodiments, CNN 640 performs the first subsampling function based on an aggregation function. In an example, CNN 640 performs the first subsampling function based on CNN 640 determining the maximum input among the values provided to a given neuron (referred to as a max pooling function). In another example, CNN 640 performs the first subsampling function based on CNN 640 determining the average input among the values provided to a given neuron (referred to as an average pooling function). In some embodiments, CNN 640 generates an output based on CNN 640 providing the values to each neuron of first subsampling layer 644, the output sometimes referred to as a subsampled convolved output.

At step 665, CNN 640 performs a second convolution function. In some embodiments, CNN 640 performs the second convolution function in a manner similar to how CNN 640 performed the first convolution function, described above. In some embodiments, CNN 640 performs the second convolution function based on CNN 640 providing the values output by first subsampling layer 644 as input to one or more neurons (not explicitly illustrated) included in second convolution layer 646. In some embodiments, each neuron of second convolution layer 646 is associated with a filter, as described above. The filter(s) associated with second convolution layer 646 may be configured to identify more complex patterns than the filter associated with first convolution layer 642, as described above.

In some embodiments, CNN 640 performs the second convolution function based on CNN 640 multiplying the values provided as input to each of the one or more neurons included in second convolution layer 646 with the values of the filter that corresponds to each of the one or more neurons. For example, CNN 640 can multiply the values provided as input to each of the one or more neurons included in second convolution layer 646 with the values of the filter that corresponds to each of the one or more neurons to generate a single value or an array of values as an output.

In some embodiments, CNN 640 provides the outputs of each neuron of second convolutional layer 646 to neurons of a downstream layer. For example, CNN 640 can provide the outputs of each neuron of first convolutional layer 642 to corresponding neurons of a subsampling layer. In an example, CNN 640 provides the outputs of each neuron of first convolutional layer 642 to corresponding neurons of second subsampling layer 648. In some embodiments, CNN 640 adds a bias value to the aggregates of all the values provided to each neuron of the downstream layer. For example, CNN 640 adds a bias value to the aggregates of all the values provided to each neuron of second subsampling layer 648. In such an example, CNN 640 determines a final value to provide to each neuron of second subsampling layer 648 based on the aggregates of all the values provided to each neuron and an activation function associated with each neuron of second subsampling layer 648.

At step 670, CNN 640 performs a second subsampling function. For example, CNN 640 can perform a second subsampling function based on CNN 640 providing the values output by second convolution layer 646 to corresponding neurons of second subsampling layer 648. In some embodiments, CNN 640 performs the second subsampling function based on CNN 640 using an aggregation function. In an example, CNN 640 performs the first subsampling function based on CNN 640 determining the maximum input or an average input among the values provided to a given neuron, as described above. In some embodiments, CNN 640 generates an output based on CNN 640 providing the values to each neuron of second subsampling layer 648.

At step 675, CNN 640 provides the output of each neuron of second subsampling layer 648 to fully connected layers 649. For example, CNN 640 provides the output of each neuron of second subsampling layer 648 to fully connected layers 649 to cause fully connected layers 649 to generate an output. In some embodiments, fully connected layers 649 are configured to generate an output associated with a prediction (sometimes referred to as a classification).

As an example, the output can include a prediction regarding an action being performed by the passenger(s) of the vehicle 200. Example actions include sitting, sleeping, lying down, applying makeup or other cosmetics, taking out and/or putting on earphones, taking out a device, and operating the device. Further example actions include speaking on a telephone, participating in a video conference, giving a presentation, etc.

As another example, the output can include a prediction regarding a poses of the passenger(s) of the vehicle 200. For example, the output can include a predicted location and/or orientation of one or more body parts of a passenger, such as the passenger's head, arms, hands, fingers, legs, feet, torso, etc.

As another example, the output can include a prediction regarding a physical gestures (e.g., movements of one or more body parts) performed by the passenger(s) of the vehicle 200. For example, the output can indicate predicted movements of the user's head, arms, hands, fingers, legs, feet, etc.

As another example, the output can include a prediction regarding vital signs of the passenger(s) of the vehicle 200. For example, the output can indicate a predict temperature of a passenger, a breath rate or respiration rate of a passenger, and a heart rate of a passenger.

As another example, the output can include a prediction regarding a passenger's facial expressions. For example, the output can indicate a prediction regarding whether the passenger is smiling, frowning, staring, etc.

As another example, the output can include a prediction regarding a passenger's gaze (e.g., whether the user is looking out of a window of the vehicle 200, looking at another passenger in the vehicle 200, looking at the user device 508, etc.).

As another example, the output can include a prediction regarding a passenger's attire. For example, the output can include a prediction regarding whether a passenger is wearing a shirt, pants, a hat, a dress, a skirt, shorts, socks, eyewear (e.g., corrective glasses, sunglasses, etc.), and/or any other garment. Further, the output can indicate a prediction regarding the style or type of the passenger's attire (e.g., whether the garment is formal attire, business attire, casual attire, athletic attire, swimwear, a uniform, etc.).

As another example, the output can include a prediction regarding an emotional state of passenger(s) of the vehicle 200. For example, the output can include a prediction regarding whether a user is happy, sad, anxious, angry, frightened, surprised, or experiencing some other emotion.

In some embodiments, the passenger comfort circuitry 500 performs one or more operations and/or provides the data associated with the prediction to a different system, described herein.

Figure 7:
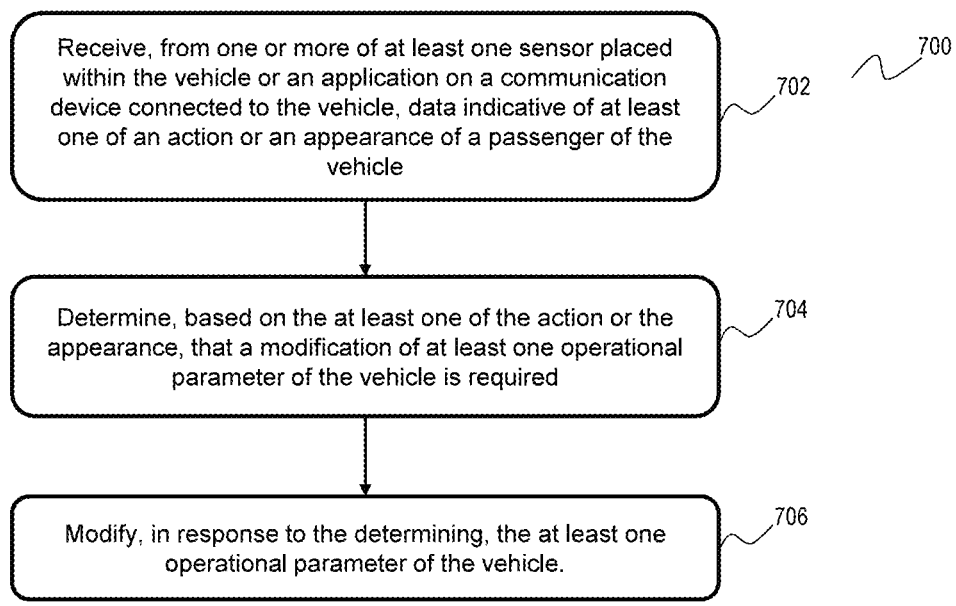
FIG. 7 is a flowchart of a process for operating a vehicle.

Referring now to FIG. 7, illustrated is a flowchart of a process 700 for operating a vehicle. In some embodiments, one or more of the steps described with respect to process 700 are performed (e.g., completely, partially, and/or the like) by passenger comfort circuitry 500. Additionally, or alternatively, in some embodiments one or more steps described with respect to process 700 are performed (e.g., completely, partially, and/or the like) by another device or group of devices separate from or including passenger comfort circuitry 500, such as one or more other components of the autonomous vehicle compute 400.

With continued reference to FIG. 7, at least one processor of a vehicle receives data indicative of at least one of an action or an appearance of a passenger of the vehicle (block 702). In some embodiments, at least some of the data can be received from at least one sensor placed within the vehicle. In some embodiments, at least some of the data can be received from an application on a communication device connected to the vehicle.

In some embodiments, the application can be a browser or a native application installed on the communication device. Further, the data can include first data indicative of a vibration of the communication device and second data indicative of an initiation of a communication on the communication device. In some embodiments, the communication can be a video call. Further, the modification of the at least one operational parameter can include at least one of a change in speed of the vehicle to a lower speed or a change in a route of the vehicle to a smoother route.

In some embodiments, the application can be a browser or a native application installed on the communication device. Further, the data can indicate that a passenger of the vehicle has an appointment scheduled at a preset time. Further, the modification of the at least one operational parameter can include varying a speed or route of the vehicle based so the vehicle reaches a destination by the preset time.

In some embodiments, the application can be a browser or a native application installed on the communication device. Further, the data can indicate that a passenger of the vehicle has a meeting scheduled at a current time or another time scheduled before a destination time. Further, the modification of the at least one operational parameter can include making modifications to a speed or a route of the vehicle such that the vehicle follows a path with internet connectivity during the meeting.

In some embodiments, the at least one sensor can include one or more motion sensors and/or pressure sensors. Further, the data can indicate that a passenger of the vehicle is lying down in the vehicle. Further, the modification of the at least one operational parameter can include a change in speed of the vehicle to a lower speed and/or a change in a route of the vehicle to a smoother route.

In some embodiments, the at least one sensor can include one or more one breath sensors configured to measure a breath rate of a passenger of the vehicle. Further, the data can indicate that the breath rate of the passenger of the vehicle is lower than a preset value. Further, the modification of the at least one operational parameter can include a change in speed of the vehicle to a lower speed and/or a change in a route of the vehicle to a smoother route.

In some embodiments, the at least one sensor can include a first camera installed on the communication device and/or a second camera attached to the vehicle (e.g., in a cabin or interior of the vehicle). Further, the data can indicate that a passenger of the vehicle is wearing a formal garment. Further, the modification of the at least one operational parameter can include a change, depending on a time of the day, in speed of the vehicle to a faster speed or a route of the vehicle to a faster route.

In some embodiments, the at least one sensor can include a first camera installed on the communication device and/or a second camera attached to the vehicle (e.g., in a cabin or interior of the vehicle). Further, the data can indicate that a passenger of the vehicle is putting on earphones. Further, the modification of the at least one operational parameter can include a change in a route of the vehicle to a quieter route.

With continued reference to FIG. 7, the at least one processor determines, based on the at least one of the action or the appearance, that a modification of at least one operational parameter of the vehicle is required (block 704).

In some embodiments, the modification of the at least one operational parameter can include a modification of a route of the vehicle, a speed of the vehicle at different points in time before reaching a destination, and/or a movement of the vehicle.

In some embodiments, the modification of the route can include an avoidance of at least one noisy area, an avoidance of at least one tunnel, an avoidance of at least one crowded area, a preference of a smoother route based on a material of a path on which the vehicle moves during the route; and/or minimizing a number of stops for the vehicle.

In some embodiments, the modification of the route can include deploying a machine learning model that has been trained to perform the avoidance of at least one noisy area, the avoidance of at least one tunnel, the avoidance of at least one crowded area, the preference of a smoother route based on a material of a path on which the vehicle moves during the route, or the minimizing a number of stops for the vehicle.

Further, the machine learning model can be trained, at least in part, by computing variables associated with the machine learning model to optimize the machine learning model.

Further, at least one machine learning model can include at least one neural network model that includes a plurality of artificial neurons arranged within a plurality of layers of the at least one neural network. The optimization of the variables of the at least one neural network model can include computing weights and a bias for each artificial neuron of the plurality of artificial neurons to optimize for the avoidance of at least one noisy area, the avoidance of at least one tunnel, the avoidance of at least one crowded area, the preference of a smoother route based on a material of a path on which the vehicle moves during the route, or the minimizing a number of stops for the vehicle. The weights and the bias for each artificial neuron can be the variables.

With continued reference to FIG. 7, the at least one processor modifies the at least one operational parameter of the vehicle in response to the determining (block 706).

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
receiving, by at least one processor of a vehicle and from an application on a communication device connected to the vehicle, data indicative of at least one of an action or an appearance of a passenger of the vehicle, wherein the data comprises:
first data indicative of a vibration measured by one or more sensors of the communication device, and
second data indicative of an initiation of a communication on the communication device by a user;
determining, by the at least one processor and based on the at least one of the action or the appearance, a modification of at least one operational parameter of the vehicle, wherein the modification of the at least one operational parameter comprises at least one of a change in speed of the vehicle to a lower speed or a change in a route of the vehicle to a smoother route; and
modifying, by the at least one processor and in response to the determining, the at least one operational parameter of the vehicle.

2. The method of claim 1, wherein:
the data is received further from one or more of at least one motion sensor or at least one pressure sensor;
the data indicates that a passenger of the vehicle is lying down in the vehicle; and
the modification of the at least one operational parameter comprises at least one of a change in speed of the vehicle to a lower speed or a change in a route of the vehicle to a smoother route.

3. The method of claim 1, wherein:
the data is received further from at least one breath sensor configured to measure a breath rate of a passenger of the vehicle;
the data indicates that the breath rate of the passenger of the vehicle is lower than a preset value; and
the modification of the at least one operational parameter comprises at least one of a change in speed of the vehicle to a lower speed or a change in a route of the vehicle to a smoother route.

4. A method comprising:
receiving, by at least one processor of a vehicle and from one or more of at least one sensor placed within the vehicle or an application on a communication device connected to the vehicle, data indicative of at least one of an action or an appearance of a passenger of the vehicle,
wherein the at least one sensor comprises at least one of a first camera installed on the communication device or a second camera attached to the vehicle, and
wherein the data indicates that a passenger of the vehicle is wearing a formal garment;
determining, by the at least one processor and based on the at least one of the action or the appearance, a modification of at least one operational parameter of the vehicle, wherein the modification of the at least one operational parameter comprises a change, depending on a time of the day, in speed of the vehicle to a faster speed or a route of the vehicle to a faster route; and
modifying, by the at least one processor and in response to the determining, the at least one operational parameter of the vehicle.

5. The method of claim 1, wherein:
the application is a browser or a native application installed on the communication device;
the data indicates that a passenger of the vehicle has an appointment scheduled at a preset time; and
the modification of the at least one operational parameter comprises varying a speed or route of the vehicle based so the vehicle reaches a destination by the preset time.

6. The method of claim 1, wherein the modification of the at least one operational parameter comprises a modification of at least one of:
a route of the vehicle,
a speed of the vehicle at different points in time before reaching a destination, or
a movement of the vehicle.

7. The method of claim 6, wherein the modification of the route comprises at least one of:
avoidance of at least one noisy area;
avoidance of at least one tunnel;
avoidance of at least one crowded area;
preference of a smoother route based on a material of a path on which the vehicle moves during the route; or
minimizing a number of stops for the vehicle.

8. The method of claim 7, wherein the modification of the route comprises deploying, by the at least one processor, a machine learning model that has been trained to perform the avoidance of at least one noisy area, the avoidance of at least one tunnel, the avoidance of at least one crowded area, the preference of a smoother route based on a material of a path on which the vehicle moves during the route, or the minimizing a number of stops for the vehicle.

9. The method of claim 8, wherein the training of the machine learning model comprises computing variables associated with the machine learning model to optimize the machine learning model.

10. The method of claim 9, wherein the machine learning model comprises at least one neural network model comprising a plurality of artificial neurons arranged within a plurality of layers of the at least one neural network, wherein the optimization of the variables of the at least one neural network model comprises computing weights and a bias for each artificial neuron of the plurality of artificial neurons to optimize for the avoidance of at least one noisy area, the avoidance of at least one tunnel, the avoidance of at least one crowded area, the preference of a smoother route based on a material of a path on which the vehicle moves during the route, or the minimizing a number of stops for the vehicle, wherein the weights and the bias for each artificial neuron are the variables.

11. A system, comprising:
at least one processor, and
at least one non-transitory storage media storing instructions that, when executed by the at least one processor, cause the at least one processor to:
receive, from one or more of at least one sensor placed within a vehicle or an application on a communication device connected to the vehicle, data indicative of at least one of an action or an appearance of a passenger of the vehicle,
wherein the at least one sensor comprises at least one of a first camera installed on the communication device or a second camera attached to the vehicle, and
wherein the data indicates that a passenger of the vehicle is putting on earphones;
determine, based on the at least one of the action or the appearance, a modification of at least one operational parameter of the vehicle, wherein the modification of the at least one operational parameter comprises a change in a route of the vehicle to a quieter route; and modify, in response to the determining, the at least one operational parameter of the vehicle.

12. At least one non-transitory storage media storing instructions that, when executed by at least one processor, cause the at least one processor to:

receive, from one or more of at least one sensor placed within a vehicle or an application on a communication device connected to the vehicle, data indicative of at least one of an action or an appearance of a passenger of the vehicle, wherein the application is a browser or a native application installed on the communication device, and wherein the data indicates that a passenger of the vehicle has a meeting scheduled at a current time or another time scheduled before a destination time;

determine, based on the at least one of the action or the appearance, that a modification of at least one operational parameter of the vehicle is required, wherein the modification of the at least one operational parameter comprises making modifications to a speed or a route of the vehicle such that the vehicle follows a path with internet connectivity during the meeting; and modify, in response to the determining, the at least one operational parameter of the vehicle.

* * * * *